United States Patent [19]

Muzzell

[11] 4,289,304
[45] Sep. 15, 1981

[54] SEAT CONSTRUCTION
[75] Inventor: Stephen E. Muzzell, Ferndale, Mich.
[73] Assignee: Gulf & Western Manufacturing Company, Southfield, Mich.
[21] Appl. No.: 203,628
[22] Filed: Nov. 3, 1980

Related U.S. Application Data

[63] Continuation of Ser. No. 40,690, May 21, 1979, abandoned.

[51] Int. Cl.³ ............................................. F16F 3/02
[52] U.S. Cl. .................................... 267/112; 267/142; 297/452
[58] Field of Search ............... 267/103, 107, 108, 110, 267/111, 112, 142, 80; 5/260, 263, 267, 478; 297/452

[56] References Cited

U.S. PATENT DOCUMENTS

| | | | |
|---|---|---|---|
| 1,732,652 | 10/1929 | Lofman | 5/260 |
| 3,195,955 | 7/1965 | Richardson et al. | 267/112 X |
| 3,462,196 | 8/1969 | Arnold et al. | 267/107 X |
| 3,880,467 | 4/1975 | Tischler | 5/478 X |
| 4,120,059 | 10/1978 | Cavaler | 5/478 X |

FOREIGN PATENT DOCUMENTS

| | | | |
|---|---|---|---|
| 530569 | 9/1956 | Canada | 267/107 |
| 810723 | 1/1937 | France | 267/112 |
| 1090627 | 10/1954 | France | 267/107 |

Primary Examiner—George E. A. Halvosa

[57] ABSTRACT

A seat construction comprising a frame having spaced parallel rails and a spring assembly mounted on the frame. The spring assembly including a pair of longitudinally extending wires, each wire having a resilient layer thereon, a plurality of transversely extending wires having free ends wound about the layers of the longitudinally extending wires. Each free end of each transverse wire is partially wound about a longitudinally extending wire and then extends over an auxiliary longitudinal wire parallel with but spaced inwardly of the longitudinal wire. Finally, the extreme free end of each transverse wire is bent inwardly toward the plane of the transverse wires. A plurality of tension springs have one end connected to a longitudinally extending wire and the other end to a rail of the frame.

17 Claims, 4 Drawing Figures

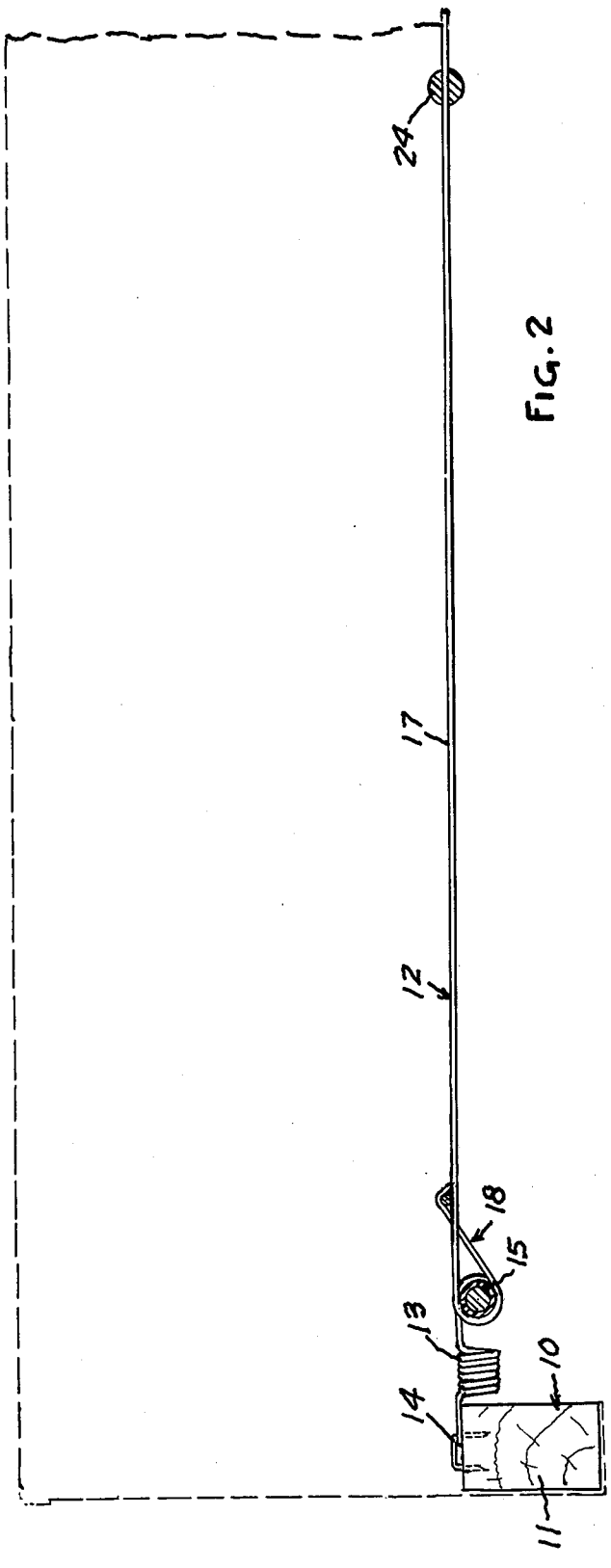
FIG. 2
FIG. 3
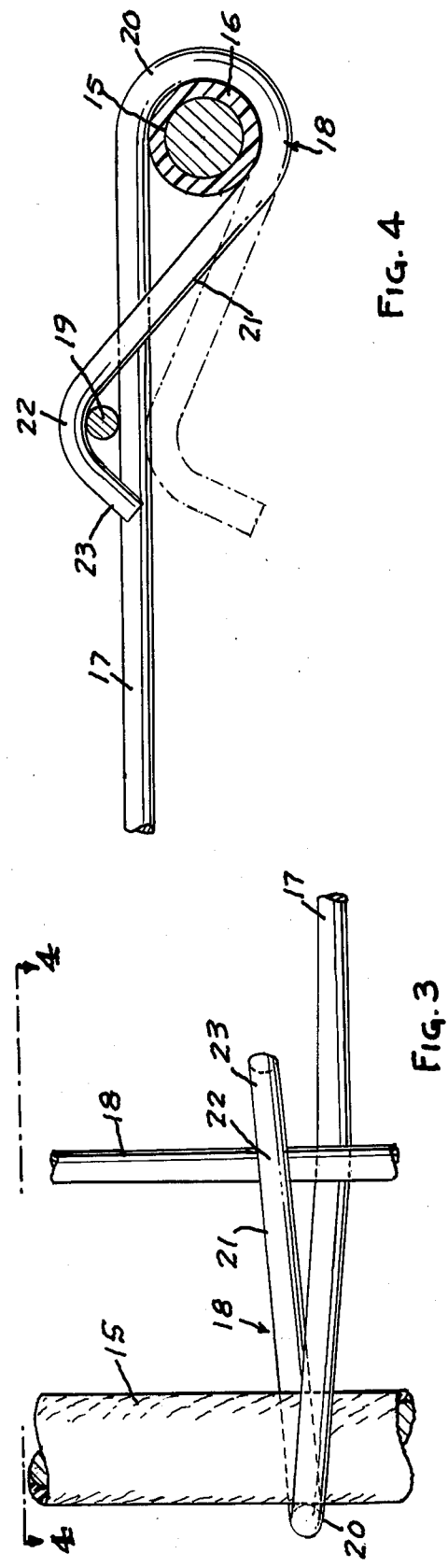
FIG. 4

SEAT CONSTRUCTION

This is a continuation of application Ser. No. 040,690, filed May 21, 1979, now abandoned.

This invention relates to seat construction and particularly to seat construction wherein a spring assembly of wires is resiliently mounted on a frame.

In one form of seat construction for automotive vehicles or furniture that has heretofore been used, a pair of longitudinally extending wires with or without a paper layer are provided and transversely extending wires are wound around the longitudinally extending wires. Tension springs extend from the longitudinally extending wires to a seat frame. As the load on the seat formed thereby varies, there is a tendency to rotate the longitudinally extending wires relative to the transversely extending wires. This causes a flexing of the transversely extending wires and possible breakage at the point where the wires are tightly wound for several convolutions around the longitudinally extending wires. This tendency for breakage results in a structure that has a much lesser life.

In another form of seat construction shown in application Ser. No. 921,851, filed in July 3, 1978, now abandoned, having a common assignee with the present application, the ends of the transverse wires are wound about the longitudinal wires with the convolutions spaced from one another to avoid the incipient breakage.

Among the objectives of the present invention is to provide a seat construction of improved design and a novel method of making the spring assembly thereof.

Basically, the invention comprises a construction wherein each free end of each transverse wire is partially wound about a longitudinally extending wire and then extends over an auxiliary longitudinal wire parallel with but spaced inwardly of the longitudinal wire. Finally, the extreme free end of each transverse wire is bent inwardly toward the plane of the transverse wires.

DESCRIPTION OF THE DRAWINGS

FIG. 2 is a fragmentary sectional view taken along the line 2—2 in FIG. 1 showing a portion of the seat frame.

FIG. 3 is a fragmentary plan view on an enlarged scale of a portion of the seat shown in FIG. 1.

FIG. 4 is a fragmentary sectional view taken along the line 4—4 in FIG. 3.

DESCRIPTION

Figure 1:
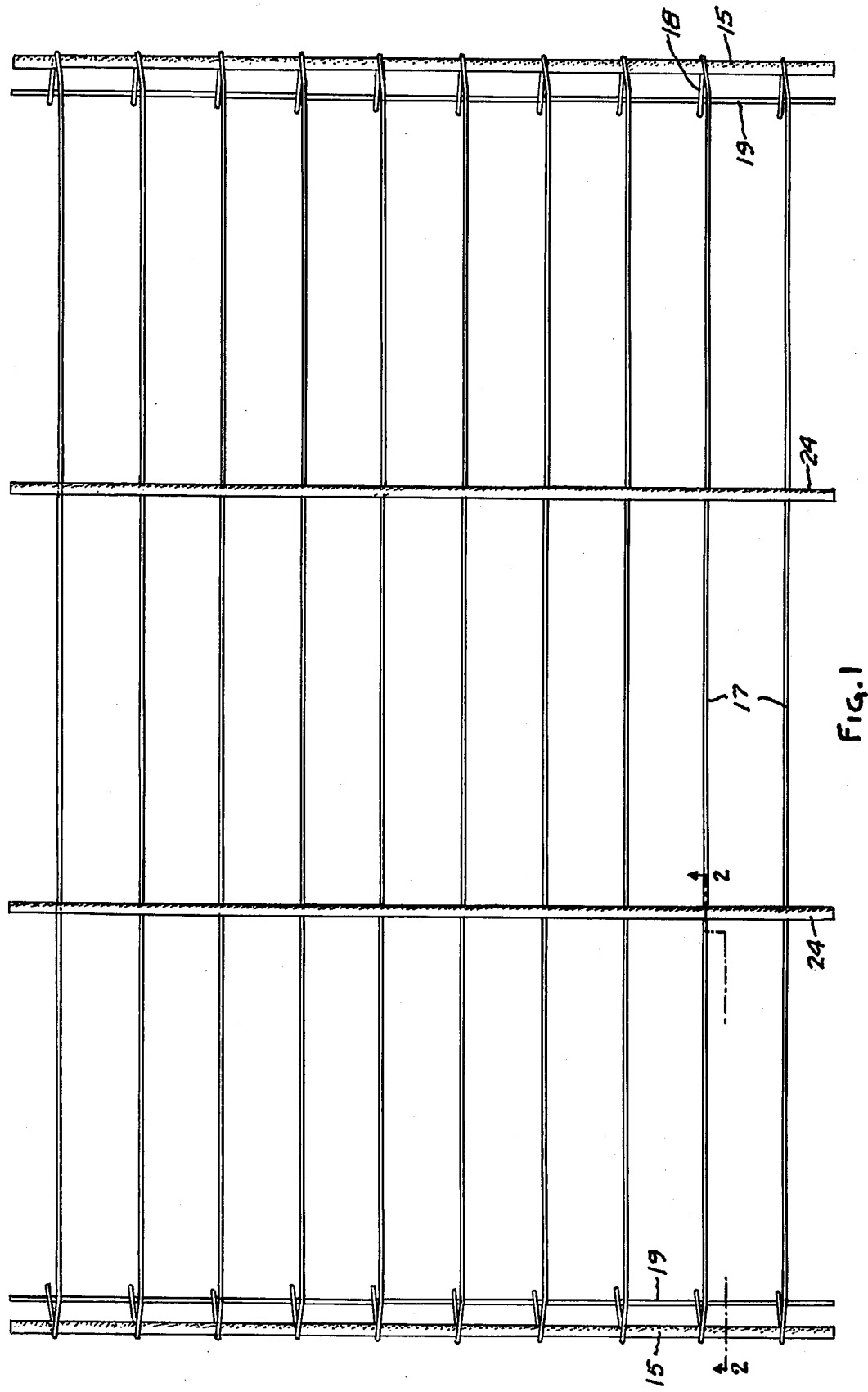
FIG. 1 is a plan view of a portion of seat construction embodying the invention.

Referring to FIGS. 1 and 2, the seat construction embodying the invention comprises a frame 10 having spaced parallel frame rails 11, a spring assembly 12 and a plurality of tension springs 13 connected to the spring assembly 12 and also fastened to the side rails 11 by staples 14 or the like. Rails 11 are usually of metal in the case of automotive vehicle seats and wood in the case of furniture.

The spring assembly 12 comprises a pair of longitudinally extending wires 15 each of which has a resilient outer layer 16 of paper or plastic and a plurality of transversely extending wires 17. Each free end 18 of each transverse wire 17 is partially wound about the longitudinal wires 15 and then over a secondary or auxiliary longitudinal wire 19 positioned on the transverse wires 17, spaced inwardly of and extending parallel to the longitudinal wire 16. The end 18 comprises a first arcuate portion 20 that extends for approximately 200 degrees about longitudinal wire, has a radius less than the radius of the layered wires 15,16, and merges with a straight portion 21 extending upwardly toward the wire 19, a second arcuate portion 22 and an extreme end 23 bent inwardly extending inwardly toward and into the plane of the transverse wires 17. The spring tension on the wires 17 caused by bending the ends 18 of the transverse wires 17 on the secondary longitudinal wires 19 tends to hold and lock the wires 17 firmly in position relative to the longitudinal wires 15.

By having the extreme free ends 23 extend into the plane of the transverse wires 17, shipment, handling and safety of workers handling the spring assembly are greatly facilitated. The diameter of the portion 20 is slightly less than the outer diameter of the layer 16 on the longitudinally extending wires 15 such that the layer 16 is partially compressed to restrict but not prevent rotation of the longitudinally extending wires 15 relative to the portions 20.

The tension springs 13 engage the longitudinally extending wires 15 with a hook at longitudinally spaced points thereon. Preferably, additional parallel longitudinal members 24 are provided made of paper or plastic and the transverse wires extend through them (FIG. 5).

Although tension springs have been shown along each longitudinally extending wire 15 in certain applications, the tension springs may be along only one longitudinally extending wire 15.

In use, the varying load on the spring assembly causes the transversely extending wires 17 to assume a downwardly and inwardly directed position relative to the longitudinally extending wires 15. The longitudinally extending wires 15 are restricted from rotation by the tension springs 13 and are relatively free to rotate relative to the transverse wires 17. Since the end 18 is spaced from the remainder of wire 17, there is no tendency for the portions of the wire 17 to bind and produce excessive force and resultant breakage as might occur if one or more tight convolutions of the wire are provided.

In the manufacture of the spring assembly optional longitudinal paper or plastic members are first pierced, then the end 18 of the transverse wire 17 is bent around the longitudinal wire 15 and then forced between the secondary longitudinal wire 19 and the longitudinal wire 15 striking an appropriately configurated anvil whereby it is caused to form. The extreme free end 23 is released and snaps down on the secondary wire 19 to complete the connection. Since the free end 23 thus extends down into the plane of the transverse wires 17, the raw edge thereof is not exposed. Moreover, the thickness afforded by the diameter of the transverse wires 17 plus the diameter of longitudinal wire 19 permits tolerance during the bending so that the last step of bending into the plane of the transverse wires 17 need not be conducted to close tolerances.

Tensile tests on a spring assembly connection were conducted wherein a portion of a spring assembly such as shown in FIG. 4 comprising a portion of longitudinal wire 15, longitudinal wire 19 and a portion of transverse wire 17 was cut and placed in an Instron testing machine. The spring assembly comprised 12 gauge paper-wrapped longitudinal wires 15 and 18 gauge oil tempered transverse wires 17.

When forces were applied, it was found that failure of the connection between the longitudinal and transverse wire occurred at 167⅔ pounds for an average of 12 samples.

This may be contrasted to similar tests on prior art connections wherein the transverse wire is bent upon itself as in U.S. Pat. No. 3,367,648 wherein the failure occurred at 136½ pounds for an average of 18 samples.

Similar tests on the connection utilizing spaced plural convolutions such as disclosed in the aforementioned United States application Ser. No. 921,851 wherein failure occurred at 46 pounds for an average of 42 samples.

I claim:

1. A seat construction comprising a frame having spaced parallel rails,
   a spring assembly comprising a pair of transversely spaced longitudinally extending wires,
   each said wire having a resilient layer thereon,
   said spring assembly including a plurality of transversely extending wires having portions wound only partially about said layers of said longitudinally extending wires,
   said spring assembly including an auxiliary longitudinal wire positioned on said transverse wires, spaced between and extending parallel to said first-mentioned longitudinal wires and substantially coplanar therewith,
   each transverse wire having a free end extending over and engaging on the adjacent auxiliary longitudinal wire to tend to hold and lock the transverse wires firmly in position relative to the first-mentioned longitudinal wires and to form a connection between the auxiliary longitudinal wire and the first-mentioned longitudinal and transverse wires of the spring assembly,
   and a plurality of tension springs having one end connected to a first-mentioned longitudinally extending wire of said spring assembly and the other end to a rail of said frame.

2. The seat construction set forth in claim 1 wherein each free end of said transversely extending wires extends at an acute angle toward the plane of the transversely extending wires.

3. The seat construction set forth in claim 1 wherein said resilient layer comprises paper or plastic.

4. The seat construction set forth in claim 1 wherein said free end of each said transverse wires comprises a first arcuate portion partially wound about said first-mentioned longitudinal wire, a second straight portion extending toward said auxiliary longitudinal wire, a third arcuate portion extending over the auxiliary wire and a fourth portion extending toward the plane of the transverse wires.

5. The seat construction set forth in claim 4 wherein said fourth portion extends into the plane of said transverse wires.

6. The spring assembly set forth in claim 5 wherein each free end of said transversely extending wires extends at an acute angle toward the plane of the transversely extending wires.

7. For use in a seat construction comprising a frame having spaced parallel rails,
   a spring assembly comprising a pair of transversely spaced longitudinally extending wires,
   each said wire having a resilient layer thereon,
   said spring assembly including a plurality of transversely extending wires having portions wound only partially about said layers of said longitudinally extending wires,
   said spring assembly including an auxiliary longitudinal wire positioned on said transverse wires, spaced between and extending parallel to said first-mentioned longitudinal wires and substantially coplanar therewith,
   each transverse wire having a free end extending over and engaging on the adjacent auxiliary longitudinal wire to tend to hold and lock the transverse wires firmly in position relative to the first-mentioned longitudinal wires and to form a connection between the auxiliary longitudinal wire and the first-mentioned longitudinal and transverse wires of the spring assembly,
   and a plurality of tension springs having one end adapted to be connected to a first-mentioned longitudinally extending wire of said spring assembly and the other end to a frame.

8. The spring assembly set forth in claim 7 wherein said resilient layer comprises paper or plastic.

9. The spring assembly set forth in claim 7 wherein said free end of each said transverse wire comprises a first arcuate portion partially wound about said first-mentioned longitudinal wire, a second straight portion extending toward said auxiliary longitudinal wire, a third arcuate portion extending over the auxiliary wire, and a fourth portion extending toward the plane of the transverse wires.

10. The seat construction set forth in claim 9 wherein said fourth portion extends into the plane of said transverse wires.

11. For use in a seat construction comprising a frame having spaced parallel rails,
    a spring assembly comprising a pair of transversely spaced longitudinally extending wires,
    each said wire having a resilient layer thereon,
    said spring assembly including a plurality of transversely extending wires having portions wound only partially about said layers of said longitudinally extending wires,
    said spring assembly including an auxiliary longitudinal wire positioned on said transverse wires, spaced between and extending parallel to said first-mentioned longitudinal wires and substantially coplanar therewith,
    each transverse wire having a free end extending over and engaging on the adjacent auxiliary longitudinal wire to tend to hold and lock the transverse wires firmly in position relative to the first-mentioned longitudinal wires and to form a connection between the auxiliary longitudinal wire and the first-mentioned longitudinal and transverse wires of the spring assembly.

12. The spring assembly set forth in claim 11 wherein each free end of said transversely extending wires extends at an acute angle toward the plane of the transversely extending wires.

13. The spring assembly set forth in claim 12 wherein said free end of each said transverse wire comprises a first arcuate portion partially wound about said first-mentioned longitudinal wire, a second straight portion extending toward said auxiliary longitudinal wire, a third arcuate portion extending over the auxiliary wire, and a fourth portion extending toward the plane of the transverse wires.

14. The spring assembly set forth in claim 13 wherein said fourth portion extends into the plane of said transverse wires.

15. The method of making a spring assembly comprising
providing a pair of transversely spaced longitudinally extending wires,
providing a plurality of transversely extending wires extending transversely of said longitudinal wires,
providing a secondary longitudinal wire on said transversely extending wires extending parallel to said first-mentioned longitudinally extending wires and substantially coplanar therewith,
bending a portion of said transverse wires only partially about the first-mentioned longitudinal wires and thereafter between the first-mentioned longitudinal wires and the adjacent secondary longitudinal wire such that the extreme free ends of the transverse wires spring past the secondary longitudinal wire and thereafter spring back over and engage on said secondary longitudinal wire to tend to hold and lock the transverse wires firmly in position relative to the first-mentioned longitudinal wires and to form a connection between the first-mentioned and secondary longitudinal wires and transverse wires.

16. The method set forth in claim 15 including the step of bending the outermost ends of said transverse wires after bending about said first-mentioned longitudinal wires in a fashion such that the springing past the secondary wire is facilitated and the outermost ends extend inwardly toward the plane of the transverse wires after the ends spring back over the secondary wire.

17. The method set forth in claim 16 wherein the point of bending of the outermost ends is such that the outermost ends extend into but not beyond the plane of the transverse wires after the ends spring back onto the secondary wire.

* * * * *